(12) United States Patent
Geyer

(10) Patent No.: US 7,101,082 B2
(45) Date of Patent: Sep. 5, 2006

(54) LINEAR BEARING

(75) Inventor: Andreas Geyer, Kolitzheim/Unterspeisheim (DE)

(73) Assignee: AB SKF, Gothenburg (SE)

( * ) Notice: Subject to any disclaimer, the term of this patent is extended or adjusted under 35 U.S.C. 154(b) by 14 days.

(21) Appl. No.: 10/787,754

(22) Filed: Feb. 27, 2004

(65) Prior Publication Data

US 2004/0213484 A1  Oct. 28, 2004

(30) Foreign Application Priority Data

Feb. 28, 2003  (DE) .................... 203 03 271 U

(51) Int. Cl.
*F16C 29/06*  (2006.01)

(52) U.S. Cl. ..................................... 384/45
(58) Field of Classification Search ............ 384/45, 384/43, 44; 464/168
See application file for complete search history.

(56) References Cited

U.S. PATENT DOCUMENTS 4,427,240 A    1/1984  Teramachi

FOREIGN PATENT DOCUMENTS

| DE | 33 13 298 A1 | 10/1984 |
|---|---|---|
| DE | 33 04 895 C2 | 11/1987 |
| DE | 36 39 544 C | 1/1992 |
| DE | 36 39 544 C2 | 1/1992 |
| DE | 40 22 168 C | 6/1994 |
| DE | 40 22 168 C2 | 6/1994 |
| GB | 911077 | 11/1962 |

*Primary Examiner*—Lenard A. Footland
(74) *Attorney, Agent, or Firm*—Buchanan Ingersoll PC

(57) ABSTRACT

A linear bearing includes a linear guide on which a carriage is translationally movable, a plurality of balls between the linear guide and carriage located in a contact area between the linear guide and the carriage on a straight line, ball deflection sections each adjoining one end of the line outside the contact area, and a ball return section, with the balls being adapted to continuously revolve along the line between the linear guide and the carriage, the ball deflection sections and the ball return section. The ball deflection sections include an end part and a ball deflector. The end part is provided with a trough-shaped depression which guides the balls, while the ball deflector includes a hemispherical or hemi-ellipsoidal section. Also, a deflection path for the balls is provided between the trough-shaped depression and the hemispherical or hemi-ellipsoidal section in a mounted state of the linear bearing.

11 Claims, 1 Drawing Sheet

LINEAR BEARING

This application is based on and claims priority under 35 U.S.C. § 119 with respect to German Application No. 203 03 271.3 filed on Feb. 28, 2003, the entire content of which is incorporated herein by reference.

FIELD OF THE INVENTION

This invention generally relates to a bearing. More particularly, the invention pertains to a linear bearing having a linear guide on which a carriage is to be translationally moved, with a plurality of balls between the linear guide and the carriage in the contact area between the linear guide and the carriage on a straight line whose ends adjoin ball deflection sections, and outside of the contact area of the balls between the linear guide and the carriage and following the ball deflection sections is located an adjoining ball return section, so that the balls can revolve continuously along the line between the linear guide and the carriage, the ball deflection sections and the ball return section.

BACKGROUND OF THE INVENTION

One example of a known linear bearing is disclosed in German Patentschrift No. DE 40 22 168 C2. In this linear bearing, a ball deflection mechanism is used consisting of a U-shaped bearing piece which is seated with its plane base surface on the face of a support body. The balls run between the cylindrical outside surface of the ball deflection mechanism and the inside of the deflection hood.

A similar approach is known from German Patentschrift No. DE 36 39 544 C2. In this linear bearing, an intermediate piece is fitted into a ball reverse track groove in order to form a ball deflection channel in the cover plate. The outer surface of the intermediate piece is made flat and is in contact with a cylindrical outer sleeve. The balls roll off on the ball reverse track groove of the intermediate piece.

British Patent Specification No. 911,077 describes a track groove for deflecting the balls, where the track groove is formed by the combination of recesses in an end piece and hemispherical elevations made on the end area of the guide rail.

In previously proposed approaches such as described above, disadvantages arise in that the ball deflection sections must be mounted directionally and generally a differentiation into right and left executions, for the two axial ends of the linear bearing, is necessary.

SUMMARY OF THE INVENTION

One aspect of the invention involves a linear bearing comprising a linear guide on which a carriage is adapted to be translationally moved, a plurality of balls between the linear guide and the carriage that are located in a contact area between the linear guide and the carriage on a straight line, ball deflection sections each adjoining one end of the line outside the contact area and, following the ball deflection sections, an adjoining ball return section so that the balls can revolve continuously along the line between the linear guide and the carriage, the ball deflection sections and the ball return section. Each of the ball deflection sections comprises an end part and a ball deflector, with the end part including a trough-shaped depression which guides the balls, and the ball deflector including a hemispherical or hemi-ellipsoidal section. The ball deflection sections also include a deflection path for the balls between the trough-shaped depression and the hemispherical or hemi-ellipsoidal section in a mounted state of the linear bearing.

The ball deflection mechanism forming a part of the linear bearing is relatively easy to mount and is able to achieve good centering of the balls. The ball entry and exit from the ball deflection section is able to take place relatively precisely without significant disruptive edges. Also, the ball deflection sections can be used at either end of the bearing, thus not requiring differently configures sections for the different ends.

The ball deflector preferably has a pin-shaped section which extends from the hemispherical or hemi-ellipsoidal section. The pin-shaped section can be located stationary in the linear guide. The ball deflector can be configured so that one part of its hemispherical or hemi-ellipsoidal section adjoins the section of the end part which is matched to the spherical shape. Also, the ball deflector is preferably made in the form of a mushroom-shaped element. Thus, the installation of this component is relatively easy and so the possibility of incorrect installation is significantly reduced. The linear bearing can therefore be produced and installed in a relatively simple manner.

According to another aspect, a linear bearing comprises a linear guide on which a carriage is translationally movable, a plurality of balls between the linear guide and the carriage that are located in an area between the linear guide and the carriage on a straight line, and a ball deflection section positioned at each end of the line to direct the balls to an adjoining ball return section so that the balls can revolve continuously along the line between the linear guide and the carriage, along the ball deflection sections and along the ball return section. Each ball deflection section comprises an end part provided with a ball-guiding trough-shaped depression leading to a deflection path, and a ball deflector including a section providing a convex surface which faces the deflection path.

BRIEF DESCRIPTION OF THE DRAWING FIGURES

The foregoing and additional features and characteristics of the present invention will become more apparent from the following detailed description of one embodiment of the present invention considered with reference to the accompanying drawing figures in which like reference numerals designate like elements.

DETAILED DESCRIPTION

Figure 1:
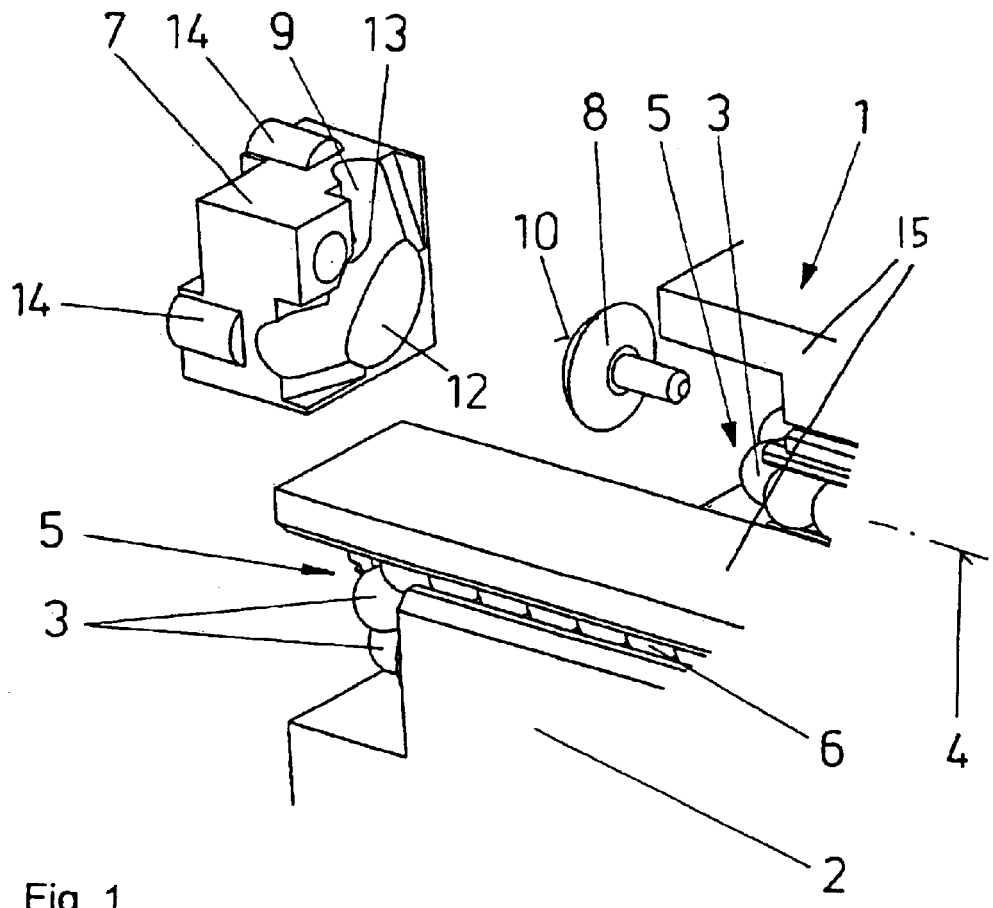
FIG. 1 is a schematic exploded perspective view of the end area of a linear bearing with a ball deflector.

Referring initially to FIG. 1, a linear bearing 1 is provided with a linear guide 2 with respect to which a carriage 15 is adapted to be translationally moved. For roller-supported linear motion, a number of balls 3 are provided which are conventionally located between the guideways of the parts which can move linearly relative to one another. The direction of the contact area between the parts which can move linearly relative to one another is indicated by the straight line 4. In the axial end areas of the linear bearing 1, the balls 3 must be deflected. For this purpose, a ball deflection section 5 is provided. The deflected balls 3 are returned to a ball return section 6 in the conventional manner in order to be deflected again in the other axial end area of the linear area 1 which is not shown and again to travel into the contact area between the two parts which can move linearly relative to one another.

The ball deflection section 5 has an end part 7 which is mounted on the axial end of the linear bearing 1. FIG. 1 represents an exploded view in this respect, since the end part 7 is illustrated with a distance from the axial end of the linear bearing 1.

Figure 2:
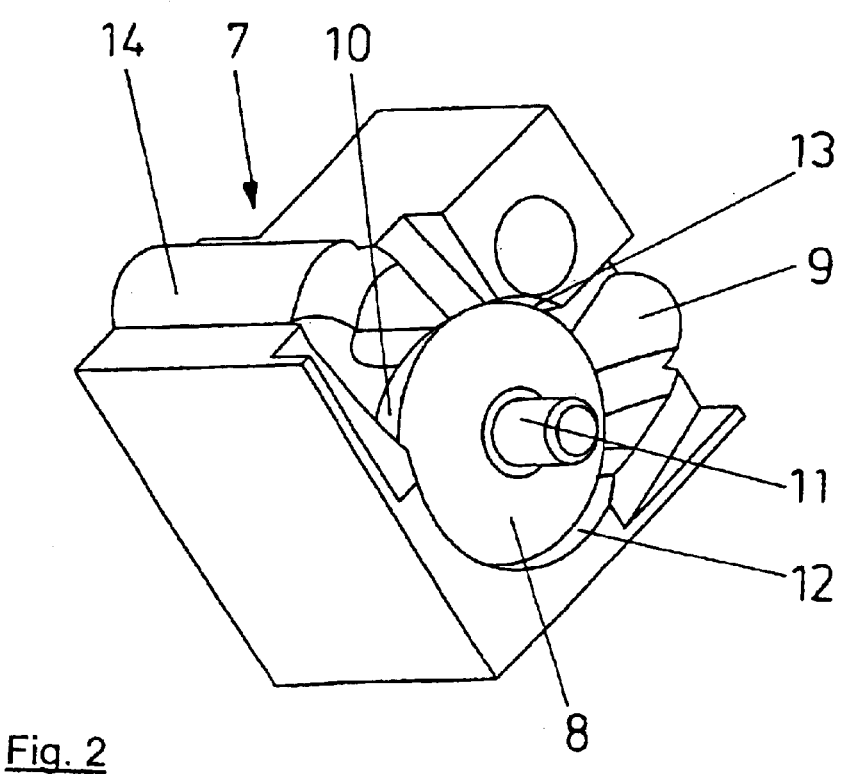
FIG. 2 is a perspective view of the end part of the linear bearing with the ball deflector.

To deflect the balls 3, a ball deflector 8 is provided which has the shape of a mushroom. The ball deflector 8 has a hemispherical or hemi-ellipsoidal section 10 which adjoins a pin-shaped section 11 as shown in FIG. 2.

However, the end part 7 of the deflector has a trough-shaped depression 9 which is used to deflect the balls. In addition, a first section 12 and a second section 13 are machined into the end part 7. The second section 13 interacts with the ball deflector 8, specifically its hemispherical or hemi-ellipsoidal section 10, and defines a deflection path for the balls 3.

The execution of the hemispherical or hemi-ellipsoidal section 10 takes place depending on the deflection geometry of the deflection part in which the balls 3 are guided. The geometrical shape of the section 10 is chosen such that entry of balls 3 into the load zone is improved.

All components are designed such that they can be used both for the right and also for the left axial end area of the linear bearing. This means that they can be installed symmetrically and with a capacity to swivel by 90°. This greatly simplifies the production cost of the linear bearing since only one tool is necessary for production of the respective parts.

The end part 7 furthermore has two projections 14 which run with a small air gap in the respective receiving groove of the end part 7 in the axial end area of the linear bearing 1. In this way, matching to the track can take place and a type of "stripping action" for the balls 3 can be achieved.

One special advantage of the proposed linear bearing is centering of the end part 7 in two axial directions in the linear bearing 1 via the ball deflector 8. Both the entry and also the exit of the balls 3 are improved by the centering action, thus relatively greatly benefitting the running behavior of the linear bearing.

Furthermore, the ball deflector 8 which is configured to have a generally "mushroom" shape due to the rotationally symmetrical cross-section provides a significant advantage in that it is fixed at the correct position when mounted, without a special adjustment measure or alignment being necessary. Furthermore, the geometrical configuration of the ball deflector 8 ensures that the balls 3 are held optimally on their deflection path.

While the balls in the deflection section conventionally run in a concave path, this is not the case with the linear bearing described and illustrated by way of the disclosed embodiment. The hemispherical or hemi-ellipsoidal surface of the ball deflector 8 constitutes an opposing convex surface for the balls 3. This produces generally spot contact with the balls 3 in this area and benefits friction. The osculation between the ball deflection section and the balls is therefore not as is conventional, but is made convex—convex according to a pairing.

The principles, preferred embodiment and operational characteristics of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A linear bearing comprising:
   a linear guide on which a carriage is adapted to be translationally moved;
   a plurality of balls between the linear guide and the carriage that are located in a contact area between the linear guide and the carriage on a straight line;
   ball deflection sections each adjoining one end of the line outside the contact area and, following the ball deflection sections, an adjoining ball return section so that the balls can revolve continuously along the line between the linear guide and the carriage, the ball deflection sections and the ball return section,
   each of the ball deflection sections comprising an end part and a ball deflector, the end part including a trough-shaped depression which guides the balls, the ball deflector including a hemispherical or hemi-ellipsoidal section, and a deflection path for the balls between the trough-shaped depression and the hemispherical or hemi-ellipsoidal section in a mounted state of the linear bearing.

2. The linear bearing according to claim 1, wherein the ball deflector also includes a pin-shaped section extending from the hemispherical or hemi-ellipsoidal section.

3. The linear bearing according to claim 2, wherein the pin-shaped section is located stationary in the linear guide.

4. The linear bearing according to claim 3, wherein the ball deflector is mushroom-shaped.

5. The linear bearing according to claim 4, wherein a section of the end part adjoining a portion of the hemispherical or hemi-ellipsoidal section of the ball deflector matches the portion of the hemispherical or hemi-ellipsoidal section of the ball deflector in shape.

6. The linear bearing according to claim 3, wherein a section of the end part adjoining a portion of the hemispherical or hemi-ellipsoidal section of the ball deflector matches the portion of the hemispherical or hemi-ellipsoidal section of the ball deflector in shape.

7. The linear bearing according to claim 2, wherein the ball deflector is mushroom-shaped.

8. The linear bearing according to claim 2, wherein a section of the end part adjoining a portion of the hemispherical or hemi-ellipsoidal section of the ball deflector matches the portion of the hemispherical or hemi-ellipsoidal section of the ball deflector in shape.

9. The linear bearing according to claim 1, wherein the ball deflector is mushroom-shaped.

10. The linear bearing according to claim 1, wherein a section of the end part adjoining a portion of the hemispherical or hemi-ellipsoidal section of the ball deflector matches the portion of the hemispherical or hemi-ellipsoidal section of the ball deflector in shape.

11. The linear bearing according to claim 1, wherein the deflection path is formed at least in part by a machined section provided at the end part.

* * * * *

UNITED STATES PATENT AND TRADEMARK OFFICE
CERTIFICATE OF CORRECTION

PATENT NO. : 7,101,082 B2
APPLICATION NO. : 10/787754
DATED : September 5, 2006
INVENTOR(S) : Andreas Geyer It is certified that error appears in the above-identified patent and that said Letters Patent is hereby corrected as shown below:

On Title Page,
At (75) Inventor, change "Kolitzheim/Unterpeisheim" to --Kolitzheim/Unterpiesheim--.

On Title Page,
At (75) Assignee, change "Gothenburg" to --Göteborg--.

On Title Page,
At (30) Foreign Application Priority Data, change "203 03 271 U" to --203 03 271.3--

Signed and Sealed this

Twenty-sixth Day of December, 2006

JON W. DUDAS
*Director of the United States Patent and Trademark Office*